Jan. 2, 1951

R. C. MOORE ET AL 2,536,853

SAW-TOOTH-CURRENT GENERATOR

Filed March 25, 1949

INVENTORS
ROBERT C. MOORE
GEORGE LESLIE CARSON
BY
Brown, Denk & Synnestvedt
AGENTS Patented Jan. 2, 1951 2,536,853

UNITED STATES PATENT OFFICE 2,536,853

SAW-TOOTH CURRENT GENERATOR

Robert C. Moore, Erdenheim, and George Leslie Carson, Philadelphia, Pa., assignors to Philco Corporation, Philadelphia, Pa., a corporation of Pennsylvania Application March 25, 1949, Serial No. 83,366

10 Claims. (Cl. 250—36)

The invention herein described and claimed relates to a new and improved sawtooth-current generator.

The new saw-tooth-current generator may, of course, be used for various purposes. However, it may be employed to special advantage in the deflection circuits of a television system, particularly in the vertical-deflection circuits, as will become clear from the description which follows.

The new generator is capable of providing a saw-tooth-current waveform whose trace portion is substantially linear. Moreover, both the linearity and frequency of the sawtooth current remain relatively unchanged when the amplitude of the sawtooth is adjusted. This is important in television-receiver applications, for when the height (or width) of the picture is adjusted, the linearity and frequency of the sawtooth current in the deflection system is affected to a considerably less extent than in prior art deflection systems. Alternatively, when adjustments are made in the linearity of the trace, the effect upon the size of the picture and the frequency of the sawtooth current is substantially smaller than in prior art systems.

In accordance with a preferred embodiment of the present invention, the stability of the vertical-deflection system of the television receiver is substantially improved by means of an arrangement which renders the new sawtooth-current generator less easily influenced by noise pulses.

It is an object then of this invention to provide a sawtooth-current generator capable of producing a sawtooth-current waveform of improved linearity.

It is another object of this invention to provide, for use in the deflection circuits of a television system, a sawtooth-current generator whose current waveform is substantially linear, and whose linearity remains relatively unchanged when adjustments are made in the amplitude of the sawtooth current, and, alternatively, whose sawtooth-current amplitude and frequency remain relatively unchanged when the linearity is adjusted.

Another object of this invention is to provide, for a television receiver, a vertical-deflection system of improved linearity and stability.

These and other objects, features and advantages of the present invention will be best understood from a consideration of the following detailed description and accompanying drawing wherein.

Figure 1:
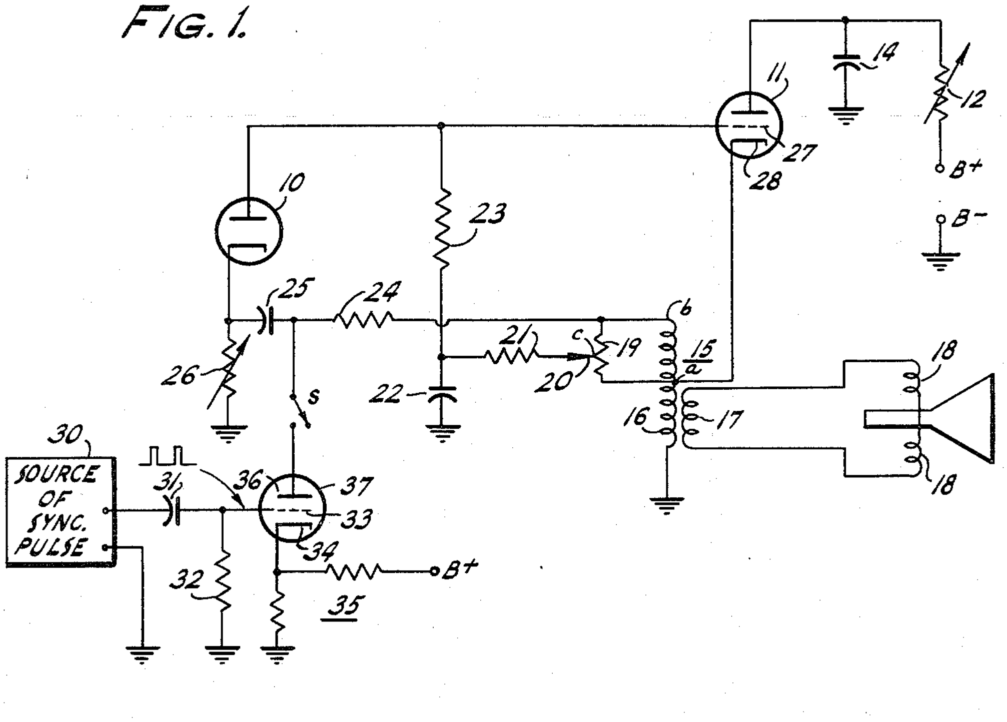
Figure 1 illustrates a preferred embodiment of the present invention.

Referring now to Figure 1, the sawtooth-current generator of the present invention comprises a discharge diode 10 and an output triode 11. The anode of triode 11 is connected to a suitable source of plate-supply voltage, B+, by way of an adjustable voltage-dropping resistor 12. Capacitor 14 is a by-pass capacitor whose function is to maintain the plate of triode 11 at a substantially constant potential.

In accordance with the present invention, the cathode 28 of triode 11 is connected to an intermediate tap point *a* on the primary winding 16 of a transformer 15. The lower end of winding 16 is connected to ground. The secondary winding 17 is connected to the vertical-deflection coils 18 of the cathode-ray tube of the television receiver.

Output triode 11 functions as a cathode follower. It has a cathode-coupled transformer load comprising primary winding 16 (tap point *a* to ground), secondary winding 17 and deflection coil 18. Since the said transformer load is effectively damped with the inverse mutual-conductance, $1/Gm.$, of the triode, the frequency response of the transformer load is substantially improved. Moreover, since the triode 11 is functioning as a cathode follower, the inherent degeneration of the cathode-follower circuit tends to make the grid voltage-plate current characteristic more linear. The improvement in frequency-response resulting from the aforesaid permits the use of a transformer having less iron, and therefore of lower cost, than is ordinarily required.

A potentiometer 19 is connected across the upper portion of primary winding 16 between the tap point *a* and the upper end *b*. The movable contact arm 20 of potentiometer 19 is connected, by way of resistor 21, to the upper plate of the charge-and-discharge capacitor 22. The lower plate of capacitor 22 is connected to ground. The upper plate of capacitor 22 is connected, by way of resistor 23, to the anode of discharge diode 10 and to the grid 27 of output triode 11. Resistor 23 serves as the load for diode 10. The high potential end *b* of primary winding 16 is connected, by way of resistor 24 and capacitor 25, to the cathode of diode 10. Variable resistor 26 connects the cathode of diode 10 to ground.

The resistor 24 which, in the circuit of Figure 1, is shown to be connected between point *b* and capacitor 25, is not required if the circuit be operated as a free-running device. Resistor 24 is employed as the load for the synchronizing-pulse injector tube 37 when the circuit is operated as a synchronized device, as will ordinarily be the case in television applications. However, before describing the synchronizing means, the action of the circuit as a free-running sawtooth generator will be explained.

It will be assumed that the circuit is in operation and that the steep retrace portion of the sawtooth waveform has just been completed. Triode 11 which had been cut off, goes into conduction and plate current starts to flow. When this occurs, a positive voltage is developed at the tap point *a* and a positive voltage of larger magnitude is induced at point *b*. Capacitor 22 immediately starts to charge toward the positive voltage appearing at a point, such as *c*, to which potentiometer arm 20 is set. The instantaneous voltage at point *c* is, of course, more positive than that at tap point *a* but less positive than that at point *b*, and is dependent upon the position of the potentiometer arm 20.

Figure 2:
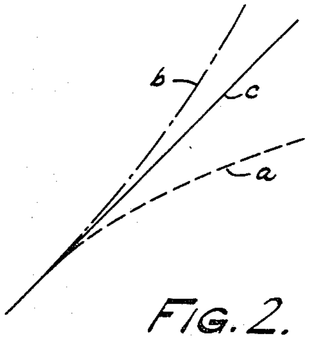
Figures 2 and 3 are graphical representations which will be helpful in explaining and understanding the invention.

As the capacitor 22 charges toward the positive voltage at point *c*, the potential of the grid 27 of triode 11 follows. The rise in the potential of the grid 27 exceeds the rise in the potential of the cathode 28, and the plate resistance of the triode decreases. The plate current increases, and the potentials at points *a*, *b* and *c* become more positive. Capacitor 22 then charges toward a positive voltage of increased magnitude, and the rate of charge is faster than it would have been if the voltage of point *c* had not increased. The potential of the grid 27 rises further relative to that of the cathode 28, the plate resistance of the tube further decreases, the plate current further increases, the potentials at points *a*, *b* and *c* rise still higher, and capacitor 22 charges toward a positive voltage whose magnitude has further increased. The action is cumulative, and capacitor 22 may, if desired, be caused to charge at an increasing exponential rate. However, by properly adjusting potentiometer 19, the rate of charge of capacitor 22 may be made substantially linear. This is shown graphically in Figure 2, where curve *a* depicts the manner in which capacitor 22 charges when potentiometer arm 20 is positioned at tap point *a*, and curve *b* depicts the manner in which capacitor 22 charges when the potentiometer arm is positioned at point *b*. It will be readily apparent that there is an intermediate point, such as *c*, at which the potentiometer arm 20 may be positioned to achieve a substantially linear rate of charge. This is indicated by curve *c*, whose rate of rise is faster than that of curve *a* but slower than that of curve *b*.

The cumulative action described in the preceding paragraph may be alternatively and briefly described as regenerative feedback controlled in degree by the positioning of arm 20 of potentiometer 19. It is to be observed that the regenerative path which exists during the interval of increasing plate current includes an RC network comprising resistor 21 and capacitor 22. This RC network exerts a low-pass filtering action upon the regenerative currents. In some instances, it may be desirable, though not necessary, to have the time constant of the RC network comprising elements 21 and 22 equal approximately to the L/R time constant of the inductive and resistive impedances of deflection coils 18.

Consider now the manner in which the discharge of capacitor 22 is effected when the circuit is operating as a free-running oscillator. It will be observed that the positive voltage built up across capacitor 22, and applied by way of resistor 23 to the grid 27 of triode 11, is also applied to the anode of diode 10. It will be observed further that the rising positive voltage at point *b* is applied across a series combination comprising essentially capacitor 25 and resistor 26. (As indicated previously, resistor 24 is not required if the circuit is to be operated as a free-running device.) The potential of the diode cathode tends to follow the rising potential at point *b* but remains less positive than that at point *b* due to the charging of capacitor 25. As the charge on capacitor 25 builds up, the difference between the rising positive potential of point *b* and the rising positive potential of the diode cathode becomes greater. This is shown graphically in Figure 3 where the dash-and-dot line represents the manner in which the potential of point *b* rises substantially linearly as a result of potentiometer arm 20 being properly positioned, and the solid line represents the manner in which the potential of the diode cathode rises at a decreasing exponential rate as a result of the charging of capacitor 25.

Figure 3:
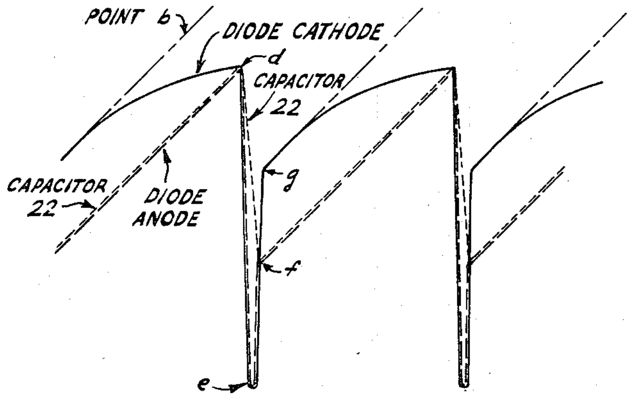

The dashed line in Figure 3 represents the manner in which the anode of diode 10 rises substantially linearly as the charge across capacitor 22 increases at a substantially linear rate as a result of the proper positioning of potentiometer arm 20. Observe that, at the start of the trace portion of the sawtooth, the potential of the diode cathode is more positive than that of the diode anode due to the high potential induced at point *b*. The potential of the diode cathode rises at a slower rate, however, than does the potential of the diode anode, due to the charging of capacitor 25. Consequently, the potentials of the diode cathode and anode approach each other in value. At a point *d*, whose location is dependent upon the time constant of capacitor 25 and resistor 26, the potential of the diode cathode becomes less positive than that of the anode, and diode 10 conducts. When this occurs, a new regenerative path is completed between point *b* and grid 27 of triode 11 by way of the conducting diode 10. This path is of high gain due to the turns-ratio existing between points *a* and *b*. Moreover, unlike the regenerative path previously mentioned which existed when diode 10 was not conducting, the path through the conducting diode does not include a low-pass filter and is, therefore, unrestricted in high-frequency response. It is the action of this path which controls the retrace interval of the scanning cycle. Since diode 10 is conducting, the grid voltage of triode 11 and the voltage across capacitor 22 can no longer continue to increase at the rate theretofore prevailing. Consequently, these voltages not only cease rising, they start falling; and because the path is highly regenerative, the action is cumulative. The voltages of grid 27 and capacitor 22 decrease rapidly and the plate current of triode 11 is cut off. Due to the well known flywheel action of the inductance 16 and its associated distributed capacitance, points *a*, *b* and *c* are carried well below ground potential. The potential of the diode cathode follows the drop in the potential of point *b*. This is shown graphically in Figure 3 where the solid line representing the cathode potential is shown to drop sharply to a point *e*. Diode 10 is conducting strongly, and the potential of the diode anode follows that of the diode cathode, as shown in Figure 3.

During this time, the capacitor 22 is discharging both by way of the path to point $b$ comprising diode 10 and resistor 23 as well as by way of the path to point $c$ through resistor 21. The discharge is indicated in Figure 3 by the dotted line.

Due to the same flywheel action of the inductance 16 and its associated distributed capacitance referred to above, the potentials of points $a$ and $b$ now rise rapidly, and the potentials of the diode cathode and diode anode follow. At a point, such as point $f$ in Figure 3, when the diode anode potential is equal to that of the capacitor 22, and hence will rise no further, the diode cathode becomes positive relative to the anode, and diode 10 goes out of conduction. However, the potential of the diode cathode continues to rise, as indicated in Figure 3 by the rise of the solid line to point $g$. Triode 11, which was momentarily cut off, is now conducting again, and as the charge across capacitor 22 builds up, the potential of the diode anode follows the rise. The cycle just described is then repeated.

Consider now the circuit of the present invention when the device is operated as a synchronized, rather than as a free-running, sawtooth-current generator. Synchronizing pulses from a high-impedance source may be applied to the new sawtooth-current generator in any known manner. However, in accordance with a preferred embodiment, illustrated in Figure 1, synchronizing pulses of positive polarity from source 30 are applied, by way of coupling capacitor 31 and grid leak 32, to the grid 33 of tube 37. A positive fixed bias is applied to the cathode 34 by means of a voltage divider 35. When switch S is closed, the anode 36 of the tube 37 is connected to the high potential plate of capacitor 25. Resistor 24 functions as the load for tube 37. The sawtooth voltage, which is developed at point $b$ in the manner previously described, consequently appears on anode 36. Due to the positive bias on cathode 34, and to the fact that the average of the sawtooth voltage on anode 36 is ground potential, anode 36 is negative with respect to cathode 34 until the sawtooth voltage on anode 36 reaches an amplitude above ground equal to the value of the cathode bias. The cathode bias is so adjusted that tube 37 is maintained slightly below cut off at its highest plate voltage.

It will be seen that tube 37 is rendered inoperative, during a large portion of the synchronizing-pulse cycle, by the sawtooth voltage applied to plate 36. In other words, tube 37 is effectively "gated" for pulses of any amplitude which occur during a large portion of the synchronizing-pulse cycle. Moreover, when the plate 36 first goes positive with respect to the cathode 34, the gain of tube 37 is very low, so that noise pulses occurring at this time are effectively suppressed. As the sawtooth of voltage on plate 36 builds up toward maximum, the gain of the tube increases, so that by the time the synchronizing pulse arrives, the gain is substantial.

When, in response to a synchronizing pulse, tube 37 conducts, a negative pulse of voltage is developed across the plate load resistor 24. This pulse of voltage is transferred to the diode cathode by way of capacitor 25, and diode 10 is driven into conduction. Capacitor 22 then discharges through the diode in the manner previously described.

For the purpose of simplifying the explanation and facilitating an understanding of the invention, the description thus far has assumed that potentiometer 19 is so adjusted as to charge capacitor 22 at a substantially linear rate. Actually this may not be the case. The end result sought to be achieved is, course, the production of a linear sawtooth of current through the deflecting coil 18. When this condition obtains, the charging curve of capacitor 22 may or may not be linear. In many instances, the charging curve will be slightly exponential, rather than linear, due to the frequency-response characteristics of the transformer. In practice, therefore, the potentiometer 19 is adjusted to produce a linear sawtooth of current through deflecting coil 18, rather than a linear sawtooth of voltage across capacitor 22.

An important advantage of the present invention is that the rise of the sawtooth of current is controllable and readily adjusted, as a result of which a substantially linear rise may be readily obtained. In this connection it is interesting to note that the time constant of the RC network, comprising the charge-and-discharge capacitor 22 and resistor 21, is very short in comparison with that ordinarily employed in prior art deflection circuits. For example, in prior art vertical deflection circuits, the time constant of the RC network is customarily ten to twenty times that of the vertical scan. In the circuit of the present invention, however, the time constant of capacitor 22 and resistor 21 is preferably shorter than that of the vertical scan, and may, for example, be of the order of one-fourth of the vertical scan.

Another important advantage of the present invention is that, when the amplitude of the sawtooth is adjusted, the linearity and frequency of the sawtooth current are affected to substantially lesser extent than in prior art circuits. Alternatively, adjustments made in the linearity of the sawtooth current have substantially less effect upon amplitude and frequency than in prior art circuits. These features are of particular importance when the circuit is employed in the deflection system of a television receiver, as adjustments may be made with a minimum of disturbance. For example, when the picture height is adjusted, as by means of resistor 12, the linearity and frequency of the sawtooth current are affected to considerably smaller extent than in prior art circuits.

In practice, it may be found that the maximum voltage between cathode 28 and the heaters (not shown) of the output triode 11 may exceed the rating of the tube. In such case, some of the turns now included in the cathode-to-ground winding of transformer 15 may be placed in the plate circuit.

Having described our invention, we claim:

1. A sawtooth-current generator comprising: a tube having at least anode, cathode and control grid electrodes; a source of positive direct-current voltage connected to said anode; a cathode load inductance across which a positive voltage is developed when the plate current through said tube is increasing; voltage step-up means so coupled to said cathode load inductance as to develop a voltage of the same polarity but larger magnitude than that developed across said cathode load inductance; a capacitor; means for connecting said capacitor to said voltage step-up means whereby said capacitor charges toward a positive voltage of larger magnitude than that developed across said cathode load inductance; means for applying the voltage developed across said capacitor to said control grid of said tube; and means effective periodically to discharge said capacitor and to reduce said plate current substantially to zero, said last-named means comprising a unilateral conducting device having anode and cathode electrodes, said last-named anode being connected to the high-potential plate of said capacitor and to the grid of said tube, said last-named cathode being connected by way of a capacitor to a high-potential point on said voltage step-up means and to ground by way of a resistance, said last-named capacitor and resistance comprising a resistance-capacitance network whose time constant determines the frequency of said sawtooth-current generator.

2. A sawtooth-current generator as claimed in claim 1, characterized in that means are provided for applying synchronizing pulses to said unilateral conducting device to render said device conductive, thus to trigger said sawtooth-current generator.

3. A sawtooth-current generator comprising: a first tube having anode and cathode electrodes; a second tube having at least anode, cathode and control grid electrodes; means connecting the anode of said first tube to the grid of said second tube; a source of positive direct-current voltage connected to the anode of said second tube; a cathode load inductance connected between the cathode of said second tube and a point of fixed reference potential, said reference potential being substantially lower than said positive direct-current voltage connected to the anode of said second tube; voltage step-up means inductively coupled to said cathode load inductance, said step-up means being so poled that the voltage developed thereacross is of the same polarity as the voltage developed across said cathode load inductance; an energy-storage device connected between a high potential point on said step-up means and the cathode of said first tube; means, including a resistance, connecting the cathode of said first tube to said point of fixed reference potential; an energy-storage device connected between said point of fixed reference potential and a point on said step-up means whose potential is higher than that at the cathode end of said cathode load inductance; means connecting the high-potential side of said last-named storage device to the anode of said first tube and to the grid of said second tube; and means for utilizing the sawtooth plate current of said second tube.

4. A sawtooth-current generator comprising: a first tube having anode and cathode electrodes; a second tube having at least anode, cathode and control grid electrodes; means connecting the anode of said first tube to the grid of said second tube; a source of positive direct-current voltage connected to the anode of said second tube; a cathode load inductance connected between the cathode of said second tube and a point of fixed reference potential, said reference potential being substantially lower than said positive direct-current voltage connected to the anode of said second tube; voltage step-up means inductively coupled to said cathode load inductance, said step-up means being so poled that the voltage developed thereacross is of the same polarity as the voltage developed across said cathode load inductance; a capacitor connected between a high potential point on said step-up means and the cathode of said first tube; means, including a resistance, connecting the cathode of said first tube to said point of fixed reference potential; a capacitor and a resistance serially connected between said point of fixed reference potential and a point on said step-up means whose potential is higher than that at the cathode end of said cathode load inductance; means connecting the high potential plate of said last-named capacitor to the anode of said first tube and to the grid of said second tube; and means for utilizing the sawtooth plate current of said second tube.

5. A sawtooth-current generator as claimed in claim 4 characterized in that means are provided for applying synchronizing pulses to said first tube to render said first tube conductive, thus to trigger said sawtooth-current generator.

6. A sawtooth-current generator comprising: a first tube having anode and cathode electrodes; a second tube having at least anode, cathode and control grid electrodes; means connecting the anode of said first tube to the grid of said second tube; a source of positive direct-current voltage connected to the anode of said second tube; a transformer having a tapped winding; means utilizing the tapped portion of said winding as a cathode load for said second tube, said means comprising a connection between the cathode of said second tube and the tap point on said winding and another connection between the low-potential end of said winding and ground; a capacitor connected between a high-potential point on said winding and the cathode of said first tube; means, including a resistance, connecting the cathode of said first tube to ground; a capacitor and a resistance serially connected between ground and a point having a potential intermediate that of said high-potential point and said tap point; means connecting the high potential plate of said last-named capacitor to the anode of said first tube and to the grid of said second tube; and means for utilizing the sawtooth plate current flowing through said second tube.

7. A sawtooth-current generator comprising: a diode; a tube having at least triode electrodes; means connecting the anode of said diode to the grid of said triode; a source of positive direct-current voltage connected to the anode of said triode; a transformer having a tapped winding; means utilizing the tapped portion of said winding as a cathode load for said triode, said means comprising a connection between the cathode of said triode and the tap point on said winding and another connection between the low-potential end of said winding and a point of fixed reference potential, said reference potential being substantially lower than said positive direct-current voltage connected to the anode of said triode; a capacitor connected between a high potential point on said winding and the cathode of said diode; means, including a resistance, connecting the cathode of said diode to said point of fixed reference potential; a potentiometer connected across a portion of said winding between said high potential point and said tap point; a capacitor and a resistance serially connected between a point on said potentiometer and said point of fixed reference potential; means, including a resistance, connecting the high potential plate of said last-named capacitor to the anode of said diode and to the grid of said triode; and means for utilizing the sawtooth current flowing in the plate-to-cathode circuit of said triode.

8. A sawtooth-current generator as claimed in claim 7 characterized in that means are provided for applying synchronizing pulses to said diode to render said diode conductive, thus to trigger said sawtooth-current generator.

9. A sawtooth-current generator comprising: a tube having at least anode, cathode and control grid electrodes; a source of positive direct-current voltage connected to said anode; a cathode load inductance across which a positive voltage is developed when the plate current through said tube is increasing; voltage step-up means so coupled to said cathode load inductance as to develop a voltage of the same polarity but larger magnitude than that developed across said cathode load inductance; a low-frequency regenerative path, including a resistance-capacitance network, connecting a high-potential point on said voltage step-up means to the control grid of said tube; a high-frequency regenerative path, including a resistance-capacitance network and a unilateral discharge device, connecting a high-potential point on said voltage step-up means to said control grid, said unilateral discharge device being so poled as to be non-conductive during the interval when the plate current through said tube is building up from its minimum value; and means, including said aforementioned resistance-capacitance networks, causing said unilateral discharge device to conduct at a predetermined time, whereby the plate current through said tube is sharply cut off.

10. A sawtooth-current generator as claimed in claim 9 characterized in that the time constant of said resistance-capacitance network in said low-frequency regenerative path is shorter than one cycle of operation of said sawtooth-current generator.

ROBERT C. MOORE.
GEORGE LESLIE CARSON.

REFERENCES CITED

The following references are of record in the file of this patent:

UNITED STATES PATENTS

| Number | Name | Date |
|---|---|---|
| 2,185,363 | White | Jan. 2, 1940 |
| 2,193,850 | Andrieu et al. | Mar. 19, 1940 |
| 2,423,931 | Etter | July 15, 1947 |